Figure 3:
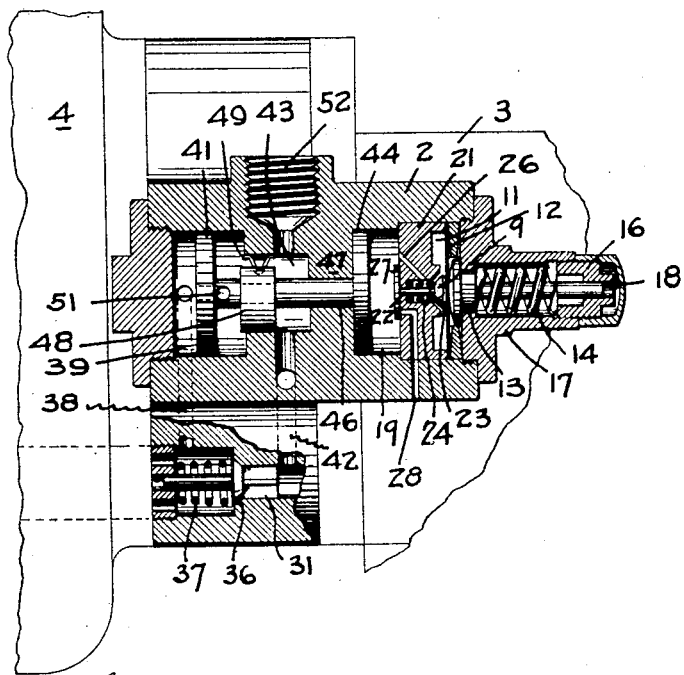

T. J. STEINKELLER.
AUTOMATIC RETAINER VALVE.
APPLICATION FILED NOV. 23, 1920.
1,397,909.
Patented Nov. 22, 1921.
2 SHEETS—SHEET 1.
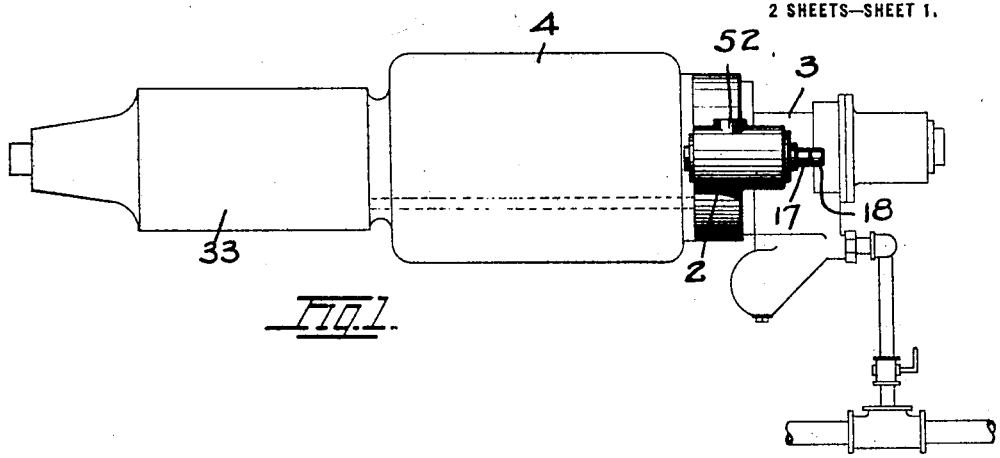
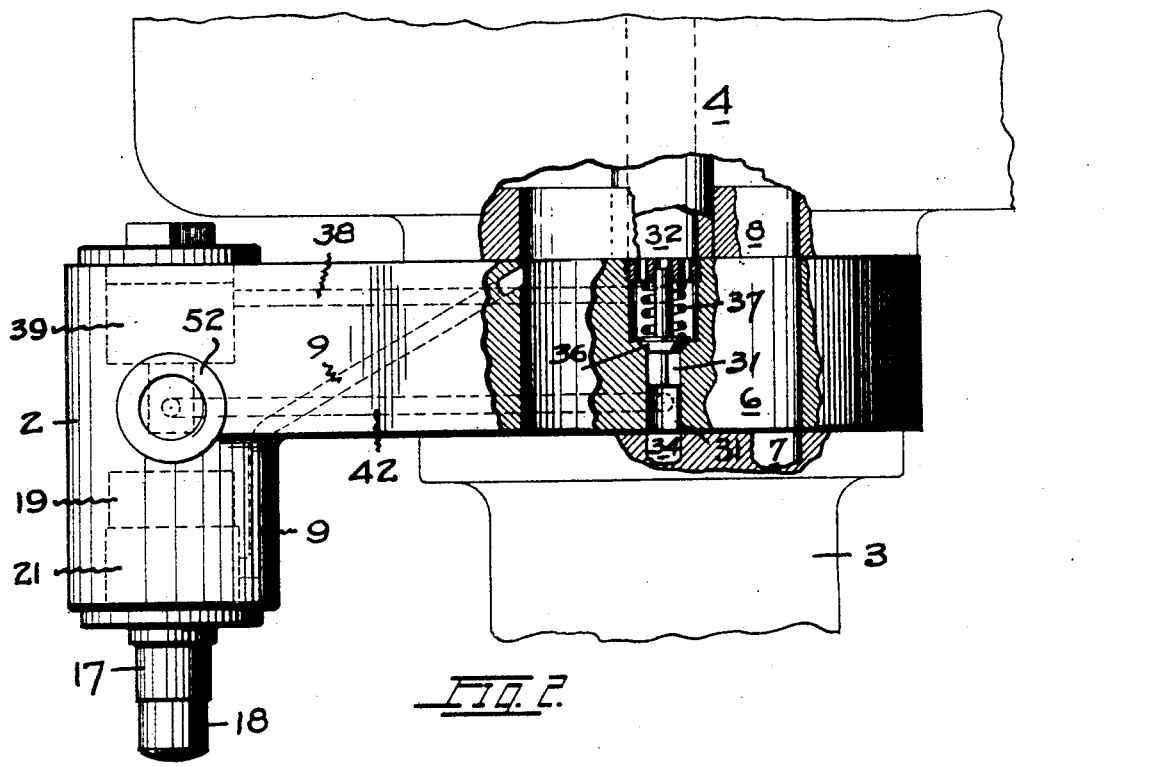
WITNESS
INVENTOR
Thomas J. Steinkeller.
BY
his ATTORNEYS

T. J. STEINKELLER.
AUTOMATIC RETAINER VALVE.
APPLICATION FILED NOV. 23, 1920.

1,397,909.

Patented Nov. 22, 1921.
2 SHEETS—SHEET 2.

WITNESS
H. Sherburne

INVENTOR
Thomas J. Steinkeller.
BY
White Prost & Evans
his ATTORNEYS

UNITED STATES PATENT OFFICE.

THOMAS J. STEINKELLER, OF BERKELEY, CALIFORNIA.

AUTOMATIC RETAINER-VALVE.

1,397,909.　　　　Specification of Letters Patent.　　Patented Nov. 22, 1921.

Application filed November 23, 1920. Serial No. 426,073.

*To all whom it may concern:*

Be it known that I, THOMAS J. STEINKELLER, a citizen of the United States, and a resident of Berkeley, county of Alameda, and State of California, have invented a new and useful Automatic Retainer-Valve, of which the following is a specification.

My invention relates to air brake apparatus.

The principal object of the invention is to provide a valve for automatically controlling the pressure in the brake cylinder of an air brake system, so that the pressure in the brake cylinder during the operation of the train cannot fall below a predetermined safe pressure.

With the standard air brake equipment now in use, the air in the auxiliary reservoir which is normally maintained at a pressure of 70 to 90 pounds is the entire pressure available for controlling the brakes of the train, except as the auxiliary reservoir pressure is increased or the reservoir fully recharged during permissible or safe releasing of the brakes. Since the auxiliary reservoir cannot be recharged in normal operation except when the brakes are off or being released, it follows that extraordinary precautions by the engineer are necessary to see that the auxiliary reservoir is fully charged at the top of every grade, and that every opportunity is taken advantage of on level stretches and curves to release the brakes and recharge the reservoir as fully as possible to maximum pressure. Only by exercising the greatest of care, can the skilful engineer so conserve the auxiliary reservoir pressure as to retain control of his train and avoid disaster. On long and difficult grades, manually operated retaining valves are used, the brakemen setting up the retaining valve on each car as needed. Assuming that 50 pounds is a safe pressure, that is, sufficient fully to control the train, my valve, for pressures above that amount, is inactive; the triple valve operating in the usual way to admit and discharge air to and from the brake cylinder in accordance with variations of pressure in the train line effected by the engine driver. When the pressure in the auxiliary reservoir falls to 50 pounds my valve functions to prevent further reduction and to trap the air at that pressure in the brake cylinder. The brakes are then held on with 50 pounds pressure, and cannot be released until the auxiliary reservoir pressure has risen above that amount. With the brakes so held, the engineer may recharge the auxiliaries without permitting acceleration of the train speed; or, if for any reason the auxiliaries cannot be recharged, a full stop is forced, so that the trouble can be located and remedied. Primarily then my valve is a safety appliance of the first magnitude, since it eliminates any possibility of loss of control of the train irrespective of the engineer's handling of the air.

About 15% of the steam generated in the boiler of the locomotive is used by the air pump, and it will be readily appreciated that the conservation of the air effected by my valve is readily expressed in terms of fuel saved. Thus, secondarily, my valve is a measure of economy, and this is true, not only on account of the substantial quantities of fuel saved, but because its use renders unnecessary certain other apparatus, such as retainer valves, and the emergency reservoirs and related mechanism found necessary on passenger equipment.

Another object of the invention is to provide a device comprising an automatic retainer valve included within a housing of such character that it may readily be interposed in standard equipment between the triple valve and the auxiliary reservoir without material changes and at little expense.

The invention possesses other objects and features of advantage, some of which, with the foregoing, will be set forth in the following description of the preferred form of my invention which is illustrated in the drawings accompanying and forming part of the specification. It is understood that I do not limit myself to the showing made by the said drawings and description, as I may adopt variations of the preferred form within the scope of my invention as set forth in the claims.

Figure 4:
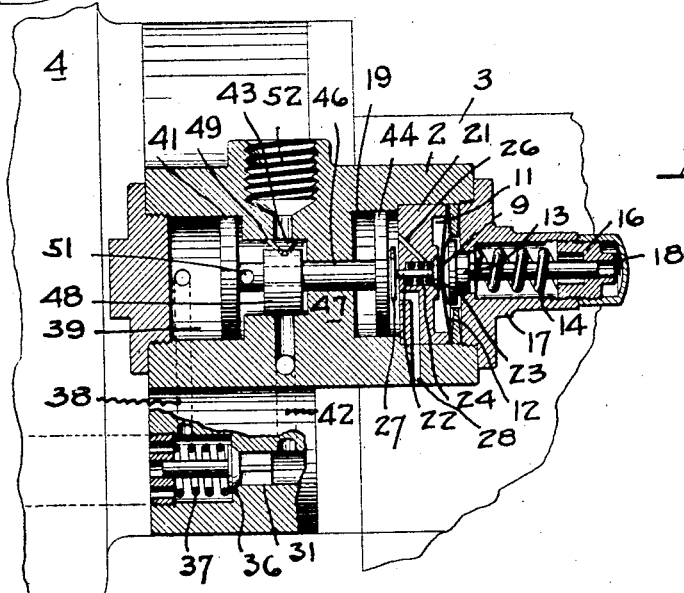

Referring to the drawings:

Figure 1 is a side elevation of the group of air brake apparatus with which my valve is assembled and directly associated. Fig. 2 is a plan view partly in section showing my valve and portions of the auxiliary reservoir and triple valve. Fig. 3 is a side elevation of the same parts shown in Fig. 2, portions being shown in section. The position of the parts in Figs. 2 and 3 is the position assumed when the auxiliary reservoir pressure is in excess of the minimum safe pressure. Fig. 4 is a view similar to Fig. 3 but showing the parts in the position assumed when the auxiliary reservoir pressure falls to the minimum safe pressure.

My pressure control valve comprises a housing 2 so formed as to adapt it for insertion between the triple valve 3 and the auxiliary reservoir 4 of standard air brake equipment. A passage 6 in the housing alined with passages 7 and 8 in the triple valve and auxiliary reservoir respectively, preserve communication between the two. Connected with this passage by passage 9 is a pressure chamber 11, of which one side is formed by the flexible diaphragm 12. The diaphragm is thus subjected at all times to auxiliary reservoir pressure. On the opposite side of the diaphragm and opposing the auxiliary reservoir pressure is a stud 13 pressed against the diaphragm by the coil spring 14. The tension of the spring is regulated by the nut 16 which also provides a bearing for the stud, and which is threaded into the annular casing extension 17 which surrounds the stud and spring. A cap 18 closes the casing and provides a lock nut for the cup nut.

Separating the pressure chamber from the chamber 19 is the wall 21 in which is arranged a valve stem 22, having a head 23 pressed against the diaphragm by the spring 24. The valve 23 controls the passage 26 connecting the chambers 11 and 19. On the same valve stem is a valve head 27 for controlling the passage 28 which connects chamber 19 with the open air. The spring 24 tends to hold the valve 23 open and the valve 27 closed, but with movement of the diaphragm under the influence of the spring 14, the valve 23 closes and the valve 27 opens, as shown in Fig. 4. The tension on the spring 14 is such that the stud 13 is held on its seat by pressure in the pressure chamber 11, in excess of a safe auxiliary reservoir pressure which for example may be assumed to be 50 pounds. That is, so long as the auxiliary reservoir pressure is above 50 pounds, the diaphragm is pressed against the stud, and the valve 23 is held open and the valve 27 closed by the spring 24, all as shown in Fig. 3. With a lessening of auxiliary reservoir pressure to 50 pounds, the diaphragm pressure is overbalanced by the pressure of the spring 14, and the valve 23 is closed and the valve 27 opened, as shown in Fig. 4. Thus, it is seen that the position of the double valve 23—27 and the closed or open condition of the passages 26 and 28 are determined by the auxiliary reservoir pressure.

Formed in the housing 2 to one side of the central passage 6 is a passage 31 alined with and connecting the passage 32 in the brake cylinder pipe leading to the brake cylinder 33 with the passages 34 in the triple valve. A valve 36, normally closed by spring 37, is arranged in the passage 31 to permit air from the triple valve to flow to the brake cylinder, but to prevent the return flow to the triple valve through the passage 31.

On the reservoir side of the valve 36, the passage 31 is connected by passage 38 with the cylindrical chamber 39, in which the piston 41 is slidably disposed. On the triple valve side of the valve 36, the passage 31 is connected by passage 42 with the chamber 43 which opens on one side into the chamber 39. Chambers 19 and 39 are preferably the same diameter and a piston 44 similar to piston 41 is disposed in chamber 19 and connected to piston 41 by the piston rod 46 which forms a sliding fit in the partition wall 47, which separates chambers 19 and 43. A slide valve 48 pressed resiliently to its seat by a spring 49 is arranged on the piston rod in the chamber 43 and is adapted to cover or uncover the passage 42 when the piston rod is moved to the right or to the left by the pistons. A passage 51 through the piston 41 permits the passage of air past this piston so that a by-pass is formed about the valve 36, but since the cross section of passage 51 is smaller than the cross section of passage 42, a pressure builds up in the chamber 39 during the flow of air through the by-pass tending to move the valve 48 to the right (in Fig. 3) to close the passage 42, the parts then being in the position shown in Fig. 4.

From the above it will be clear that so long as the auxiliary reservoir pressure exceeds the minimum safe pressure of, say 50 pounds, the stud 13 is held on its seat by diaphragm 12, and the valve 23 is open to permit the air under auxiliary reservoir pressure to pass into chamber 19, pressing the valve 44 to its extreme position against the far wall of the chamber as shown in Fig. 3. In this position the by-pass 38—51—42 about the valve 36 is open, and the triple valve is free to function in the usual way. Upon reduction in the train line pressure air from the auxiliary reservoir passes through the triple valve into passage 31 past valve 36 then into passage 32 and thence to the brake cylinder. Upon increase in the train line pressure, the air in the brake cylinder returns to the triple valve through the by-pass 38—51—42 and is exhausted into the air, the by-pass being kept open by the superior auxiliary reservoir pressure exerted against the piston 44. If however, through successive reductions in the train line pressure, the pressure in the auxiliary reservoir falls to the lower limit of safe pressures, the lowered pressure on the diaphragm permits the spring 14 to close valve 23 and open valve 27. The air in chamber 19 then exhausts into the air through passage 28 releasing all pressure against the piston 44. Since the passage 38 is of less capacity than the passage 42 the pistons and connecting rod 46 will immediately be moved to the right, of Fig. 3 moving valve 48 to cover passage 42, and preventing further escape of air from the brake cylinder through the by-pass, such pressure remaining at substantially 50 pounds, the brakes being held on with that pressure. The parts are now as shown in Fig. 4. This will bring the train to a stop unless the brake cylinder pressure is released, but a release can take place only by movement of the pistons and valve 48 to the left (of Fig. 3), so as to reëstablish the by-pass connection to the triple valve. This occurs when the diaphragm is moved to permit the valve 23 to open and the valve 27 to close, by augmentation of the auxiliary reservoir pressure to a point in excess of the minimum safe pressure.

It is therefore not within the power of the engineer to waste his air by injudicious applications until the auxiliary pressure available is insufficient to control his train. The personal equation is removed, and a safe pressure, sufficient for the full control of the train, is assured, or the train is automatically stopped to compel attention.

A threaded nipple 52 opening into the chamber 43 provides means for the attachment of a bleed valve of any desired type.

I claim:

1. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and operatively connected to said valve for closing it, and means for opening said valve when the pressure in the auxiliary reservoir exceeds a predetermined amount.

2. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and operatively connected to said valve for closing it, a second piston operatively connected to said valve for opening it, and means for applying air from the auxiliary reservoir to said second piston when the pressure in the auxiliary reservoir exceeds a predetermined amount.

3. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and operatively connected to said valve for closing it, a spring for resiliently seating said valve, and means for opening said valve when the pressure in the auxiliary reservoir exceeds a predetermined amount.

4. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber, and operatively connected to said valve for closing it, and means operated by air from the auxiliary reservoir for opening said valve when the auxiliary reservoir pressure exceeds a predetermined amount.

5. An automatic retainer valve for air brake apparatus comprising a housing formed with a passage for connecting the triple valve to the brake cylinder, a check valve in said passage, said housing being formed with a by-pass about said check valve including a cylindrical chamber, said housing being formed with a second cylindrical chamber alined with the first chamber, a piston slidably disposed in each chamber, means operatively connecting said pistons, a valve for controlling the flow of air through said by-pass actuated by said pistons, and means for automatically admitting air from the auxiliary reservoir to said second chamber when the pressure in the auxiliary reservoir exceeds a predetermined amount.

6. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and movable to close the by-pass valve by the pressure of air in the chamber, said housing being formed with a second cylindrical chamber alined with the first chamber, a piston movable in said second chamber to open said by-pass valve, and a valve operating automatically when the pressure in the auxiliary reservoir exceeds a predetermined amount for admitting auxiliary reservoir air into said second chamber.

7. An automatic retainer valve for air brake apparatus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and movable to close the by-pass valve by the pressure of air in the chamber, said housing being formed with a second cylindrical chamber alined with the first chamber, a piston movable in said second chamber to open said by-pass valve, said housing being formed with a passage for admitting air from the auxiliary reservoir to said second chamber and with a vent passage from said second chamber to the open air, a normally open valve for controlling the auxiliary reservoir passage, a normally closed valve for controlling the vent passage, and a diaphragm exposed to the auxiliary reservoir pressure for controlling the movement of said last named valves.

8. An automatic retainer valve for air brake appartus comprising a housing formed with a passage for connecting the triple valve to the brake cylinder, a check valve in said passage, said housing being formed with a by-pass about said check valve including a cylindrical chamber, a valve for controlling the flow of air through said by-pass, a piston having a passage therethrough arranged in said chamber and movable to close the by-pass valve by the pressure of air in the chamber, said housing being formed with a second cylindrical chamber alined with the first chamber, a piston movable in said second chamber to open said by-pass valve, said housing being formed with a passage for admitting air from the auxiliary reservoir to said second chamber and with a vent passage from said second chamber to the open air, a normally open valve for controlling the auxiliary reservoir passage, a normally closed valve for controlling the vent passage, a diaphragm exposed to the auxiliary reservoir pressure for controlling the movement of said last named valves, and means for varying the responsiveness of said diaphragm to said auxiliary reservoir pressure.

9. An automatic retainer valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a by-pass about said check valve including a cylindrical chamber, a valve for controlling the flow of air through said by-pass, a piston having a passage therethrough arranged in said chamber and movable by the air therein to close said by-pass valve, said housing being formed with a second cylindrical chamber and a passage connecting said second chamber with the auxiliary reservoir passage, a piston operatively connected with said by-pass valve arranged in said second chamber and under pressure from the auxiliary reservoir air therein to oppose the closing movement of said by-pass valve, and means for closing the passage between the auxiliary reservoir and the second chamber and permitting the air in the second chamber to exhaust when the pressure in the auxiliary reservoir falls to a predetermined amount.

10. An automatic retainer valve for air brake apparatus comprising a housing adapted to be interposed between the triple valve and the auxiliary reservoir and formed with a passage connecting the triple valve with the auxiliary reservoir and a second passage connecting the triple valve to the brake cylinder pipe, a check valve in said second passage, said housing being formed with a piston chamber, a valve chamber opening out of said piston chamber, a second piston chamber, a third passage connecting the first piston chamber with said second passage between the auxiliary reservoir and the check valve, a fourth passage connecting the valve chamber with said second passage between the triple valve and the check valve, and a fifth passage connecting said second chamber with said first passage, a piston having a passage therethrough of less capacity than said fourth passage arranged in said first chamber, a piston arranged in said second chamber, a rod connecting said pistons, a valve in said valve chamber and actuated by said rod to open and close said fourth passage, and means operating automatically when the auxiliary reservoir pressure falls to a predetermined amount for closing said fifth passage and permitting the air in said second chamber to exhaust whereby the by-pass valve is closed by the brake cylinder pressure on the first piston and when the auxiliary reservoir pressure rises above said predetermined amount for opening the fifth passage whereby the by-pass valve is opened by the auxiliary reservoir pressure on the second piston.

In testimony whereof I have hereunto set my hand.

THOMAS J. STEINKELLER.